US012358290B2

(12) United States Patent
Kakiuchi

(10) Patent No.: US 12,358,290 B2
(45) Date of Patent: Jul. 15, 2025

(54) LIQUID DISCHARGING HEAD

(71) Applicant: BROTHER KOGYO KABUSHIKI KAISHA, Nagoya (JP)

(72) Inventor: Toru Kakiuchi, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/500,490

(22) Filed: Oct. 13, 2021

(65) Prior Publication Data

US 2022/0126589 A1 Apr. 28, 2022

(30) Foreign Application Priority Data

Oct. 28, 2020 (JP) ................................ 2020-180599

(51) Int. Cl.
*B41J 2/175* (2006.01)

(52) U.S. Cl.
CPC .................................... *B41J 2/175* (2013.01)

(58) Field of Classification Search
None
See application file for complete search history.

(56) References Cited

U.S. PATENT DOCUMENTS

2003/0001929 A1* 1/2003 Andrews .............. B41J 2/14145 347/65
2006/0192259 A1 8/2006 Silverbrook
2019/0291434 A1 9/2019 Uchida et al.
2019/0366714 A1 12/2019 Tsukahara et al.
2019/0366717 A1 12/2019 Tsukahara et al.
2020/0094550 A1* 3/2020 Miyagishi .............. B41J 2/0454
2020/0238703 A1* 7/2020 Hayashi ............... B41J 2/14233
2020/0269574 A1 8/2020 Tsukahara et al.
(Continued)

FOREIGN PATENT DOCUMENTS

JP H06-316069 A 11/1994
JP 2009023157 A 2/2009
(Continued)

OTHER PUBLICATIONS

Japanese Office Action for the corresponding Japanese Patent Application No. 2020-180599 dated Jun. 4, 2024.

*Primary Examiner* — Alejandro Valencia
(74) *Attorney, Agent, or Firm* — KENEALY VAIDYA LLP

(57) ABSTRACT

A liquid discharging head includes: a first common channel, a second common channel, and individual channels aligned in a first direction. Each of the individual channels has: a nozzle, a pressure chamber, a descender formed in a channel substrate which is formed of silicon and which is arranged between a nozzle plate and a pressure chamber plate in a second direction orthogonal to the first direction; and a connecting channel which is formed in the channel substrate. The second common channel is formed in the channel substrate. The descender penetrates the channel substrate in the second direction, and has an inner wall surface parallel to the second direction and to a third direction orthogonal to both of the first direction and the second direction. The connecting channel extends in a fourth direction which is orthogonal to the second direction and which is inclined with respect to the third direction.

15 Claims, 7 Drawing Sheets

(56) References Cited

U.S. PATENT DOCUMENTS

| | | | | |
|---|---|---|---|---|
| 2020/0307205 | A1 | 10/2020 | Sugiura et al. | |
| 2021/0031517 | A1* | 2/2021 | Uchida | ................ B41J 2/14233 |

FOREIGN PATENT DOCUMENTS

| | | | |
|---|---|---|---|
| JP | 2015-509454 | A | 3/2015 |
| JP | WO2018061543 | A1 | 4/2018 |
| JP | 2018103601 | A | 7/2018 |
| JP | 2019-166705 | A | 10/2019 |
| JP | 2019-166718 | A | 10/2019 |
| JP | 2020044800 | A | 3/2020 |
| JP | 2020-138373 | A | 9/2020 |
| JP | 2020168756 | A | 10/2020 |
| WO | 2013/134322 | A1 | 9/2013 |

* cited by examiner

2/7

LIQUID DISCHARGING HEAD

CROSS REFERENCE TO RELATED APPLICATION

The present application claims priority from Japanese Patent Application No. 2020-180599, filed on Oct. 28, 2020, the disclosure of which is incorporated herein by reference in its entirety.

BACKGROUND

Field of the Invention

The present disclosure relates to a liquid discharging head which discharges or ejects a liquid from a nozzle.

Description of the Related Art

As an example of the liquid discharging head which discharges or ejects a liquid from a nozzle, there is known a liquid jetting head which has a configuration to be explained in the following. In this liquid jetting head, the plurality of nozzles are aligned in a Y direction, and each of the plurality of nozzles communicates with a pressure chamber via a communicating channel extending in a Z direction orthogonal to the Y direction. Further, a plurality of pieces of the communicating channel each of which corresponds to one of the plurality of nozzles are connected to a common recovered liquid chamber via a recovery channel. Further, a plurality of pieces of the recovery channel are formed in an upper part of a nozzle plate in which the plurality of nozzles are formed, and extend in a X direction which is orthogonal to both of the Y direction and the Z direction.

SUMMARY

In the above-described liquid jetting head, the discharging property (ejecting property) of a liquid from the nozzle is changed depending on to which extent the pressure applied to the liquid in the pressure chamber is transmitted to the liquid in the recovery channel. Further, the extent to which the pressure applied to the liquid in the pressure chamber is transmitted to the liquid in the recovery channel is changed depending on the channel resistance in the recovery channel. From these viewpoints, in the above-described liquid jetting head, it is preferred that the channel resistance in the plurality of recovery channels is uniform, in view of suppressing any variation or fluctuation in the discharging property of the liquid among the nozzles.

However, in the above-described liquid jetting head, the plurality of recovery channels extending in the X direction are formed in the upper part of the nozzle plate. In a case that such a plurality of recovery channels extending in the X direction are formed in the nozzle plate by the etching, etc., any fluctuation or variation in the height is likely to occur among the plurality of recovery channels. Accordingly, any fluctuation or variation in the channel resistance is likely to occur among the plurality of recovery channels.

An object of the present disclosure is to provide a liquid discharging head in which a plurality of descenders each of which connects a nozzle and a pressure chamber, and a plurality of connecting channels each of which connects one of the plurality of descenders and a common channel can be formed with a high precision.

According to an aspect of the present disclosure, there is provided a liquid discharging head including: a first common channel, a second common channel, and a plurality of individual channels which communicate with the first common channel and the second common channel and which are aligned in a first direction. Each of the plurality of individual channels has: a nozzle formed in a nozzle plate; a pressure chamber which is formed in a pressure chamber plate and which communicates with the first common channel, the pressure chamber plate being arranged to be apart from the nozzle plate in a second direction orthogonal to the first direction; a descender which is formed in a channel substrate, which extends in the second direction and which connects the nozzle and the pressure chamber, the channel substrate being formed of silicon and arranged between the nozzle plate and the pressure chamber plate in the second direction; and a connecting channel which is formed in the channel substrate, and which connects the descender and the second common channel. The second common channel is formed in the channel substrate. The descender penetrates the channel substrate in the second direction, and has an inner wall surface parallel to the second direction and to a third direction orthogonal to both of the first direction and the second direction. The connecting channel extends in a fourth direction which is orthogonal to the second direction and which is inclined with respect to the third direction.

DETAILED DESCRIPTION

In the following, an embodiment of the present disclosure will be explained.

<Overall Configuration of Printer 1>

Figure 1:
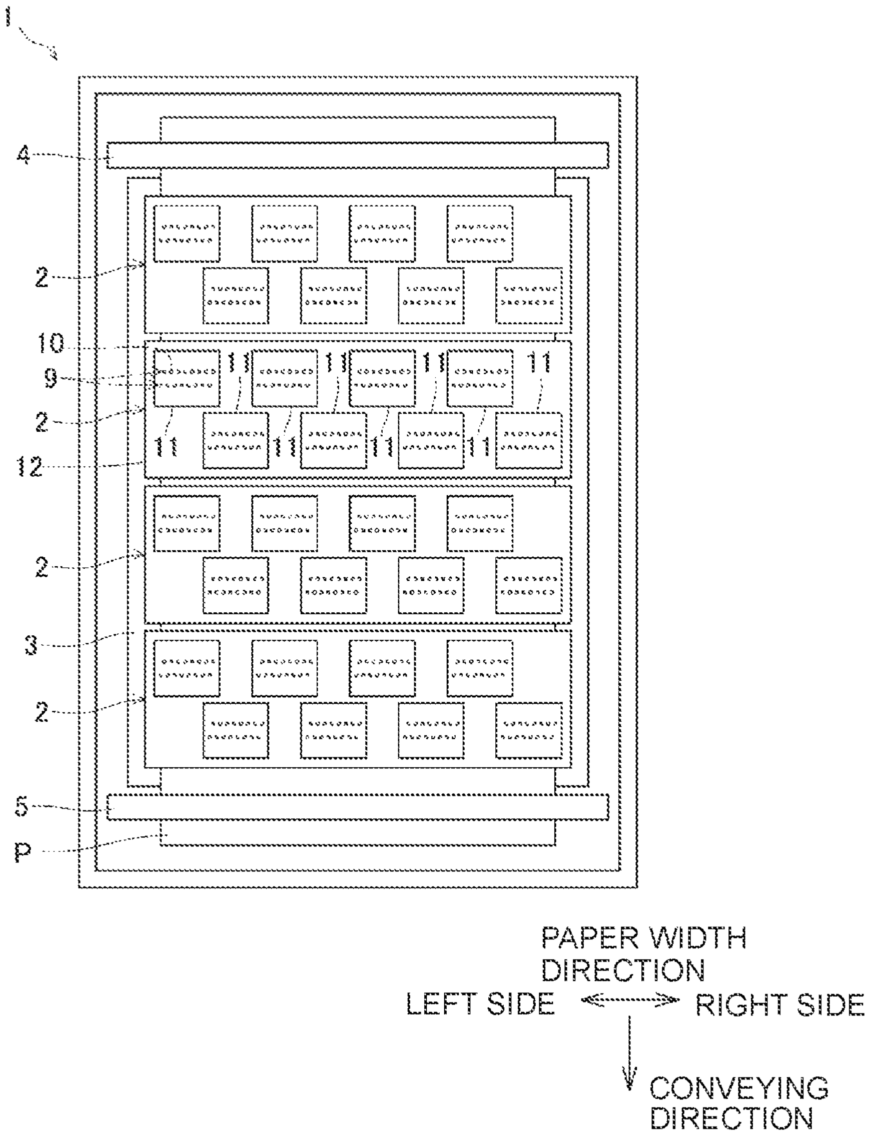
FIG. 1 is a view schematically depicting the configuration of a printer.
Figure 2:
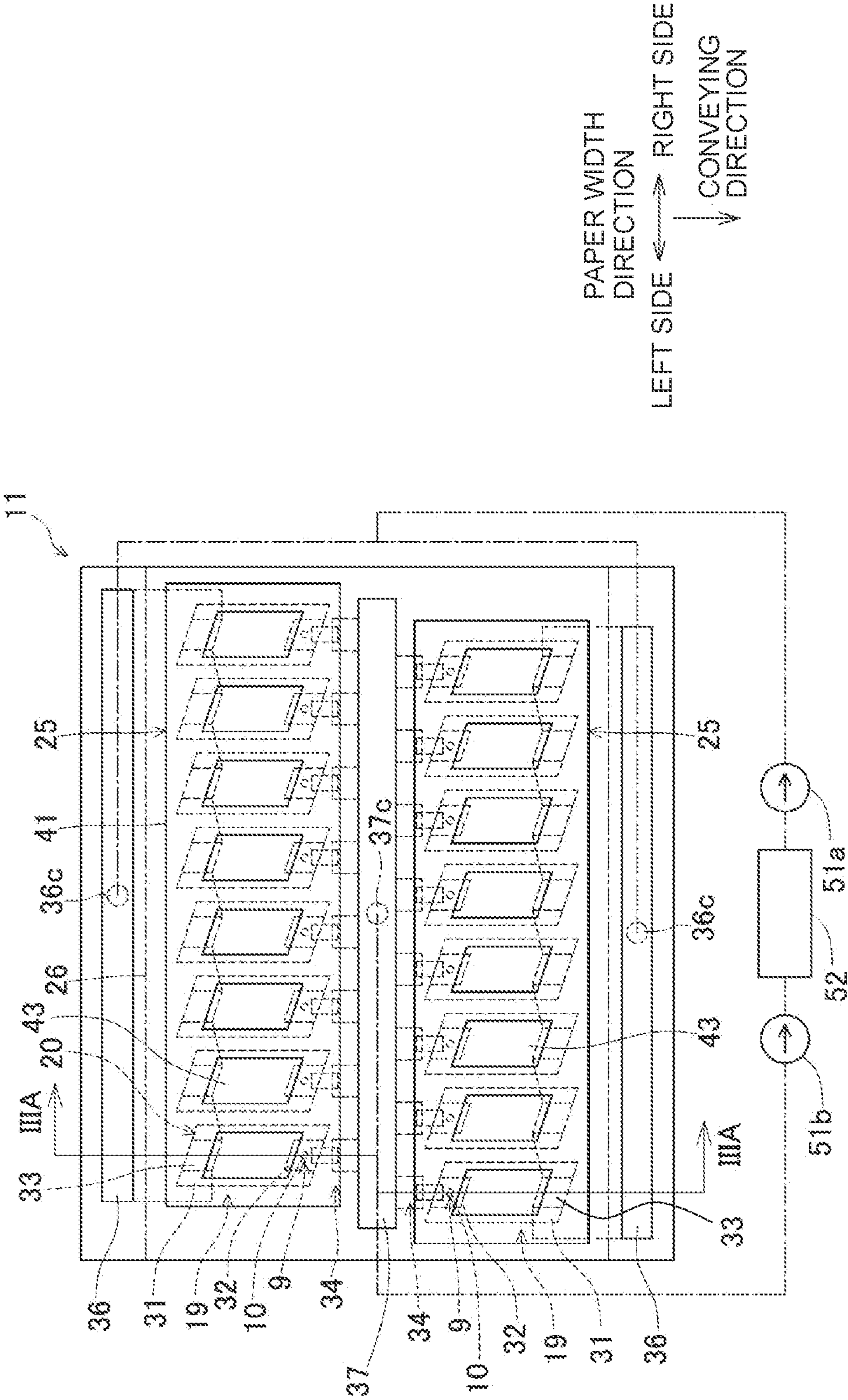
FIG. 2 is a plan view of a head provided on the printer depicted in FIG. 1.
Figure 3A:
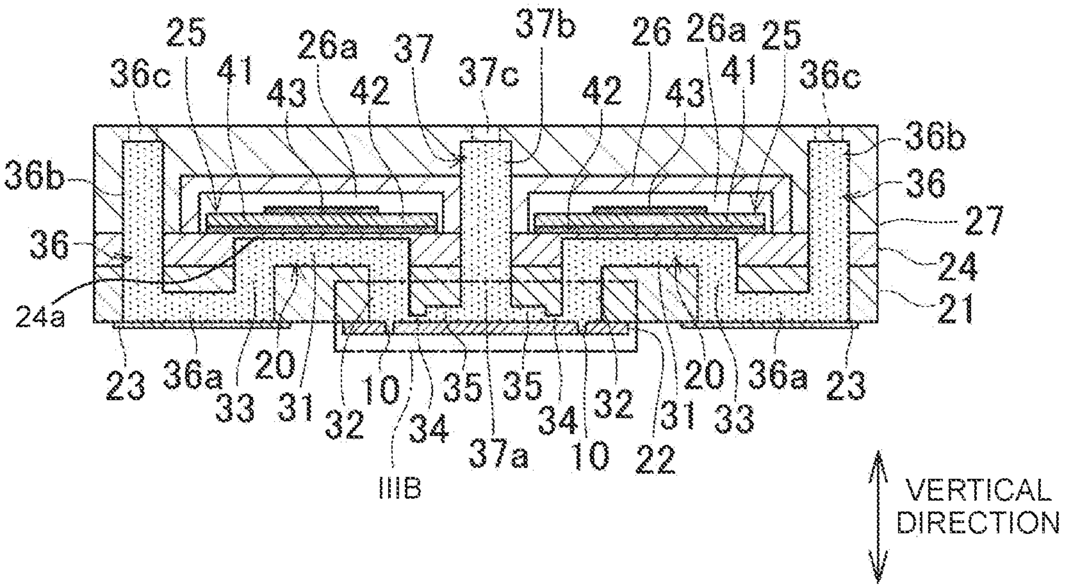
FIG. 3A is a cross-sectional view taken along a line IIIA-IIIA in FIG. 2.
Figure 3B:
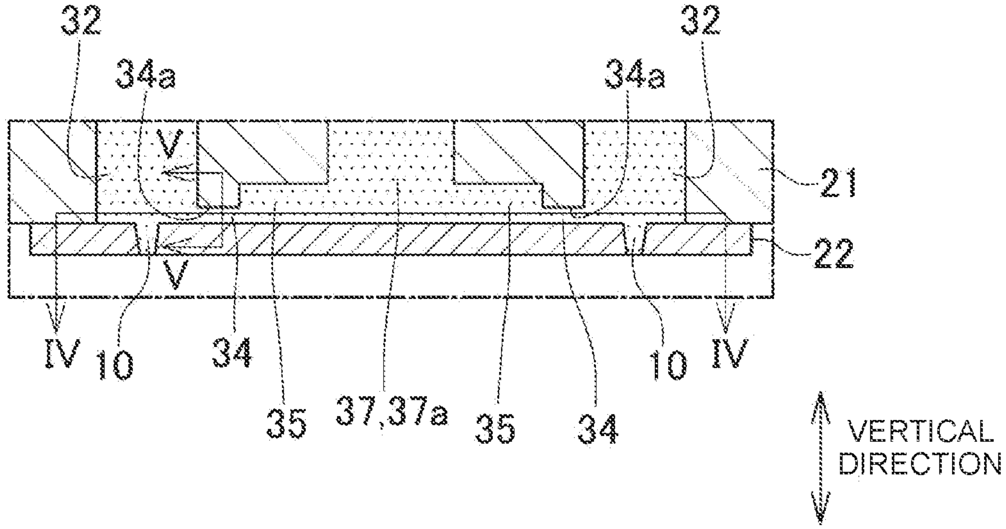
FIG. 3B is an enlarged view of a IIIB part in FIG. 3A.

As depicted in FIG. 1, a printer 1 according to the present embodiment is provided with four head units 2, a platen 3, and conveying roller pairs 4 and 5. The four head units 2 are arranged side by side in a horizontal conveying direction (a “third direction” of the present disclosure) in which a recording paper sheet (recording paper) P is conveyed by the conveying roller pairs 4 and 5, as will be described later on. Each of the four head units 2 is provided with eight pieces of a head 11 (a “liquid discharging head” of the present disclosure), and a head holding member 12.

Each of the eight pieces of the head 11 discharges or ejects an ink from a plurality of nozzles 10 formed in a lower surface thereof. The plurality of nozzles 10 are aligned in a paper width direction (a “first direction” of the present disclosure) which is horizontal and orthogonal to the conveying direction to thereby form a nozzle row (nozzle array) 9. Further, each of the eight heads 11 has two pieces of the nozzle row 9 arranged side by side in the conveying direction. In each of the eight heads 11, the two pieces of the nozzle row 9 include a nozzle row 9 located on the upstream side and a nozzle row 9 located on the downstream side in the conveying direction. Nozzles 10 constructing the nozzle row 9 located on the upstream side and nozzles 10 constructing the nozzle row 9 located on the downstream side in the conveying direction are shifted from one another in the paper width direction by a length half the spacing distance between the nozzles 10 in each of the nozzle rows 9.

Further, among the eight heads 11, four heads 11 are arranged side by side with a spacing distance therebetween in the paper width direction. Furthermore, the remaining four heads 11 among the eight heads 11 are arranged side by side with a spacing distance therebetween in the paper width direction, at a location shifted, to the downstream side in the conveying direction, from the above-described four heads 11. Moreover, positions in the paper width direction of the four heads 11 on the upstream side in the conveying direction are shifted from positions in the paper width direction of the four heads 11 on the downstream side in the conveying direction. With this, the plurality of nozzles 10 of the eight heads 8 which construct one head unit 2 among the four head units 2 are arranged over the entire length in the paper width direction of the recording paper sheet P.

The head holding member 12 is a rectangular plate-shaped member of which longitudinal direction is the paper width direction. The head holding member 12 holds the eight heads 11 in the above-described positional relationship.

Further, black, yellow, cyan and magenta inks are discharged or ejected from the plurality of nozzles 10 constructing the heads 11 constructing the four head units 2. The four head units 2 include a head unit of the black ink, a head unit of the yellow ink, a head unit of the cyan ink and a head unit of the magenta ink, which are arranged in this order from the upstream side in the conveying direction.

The platen 3 is arranged at a location below the four head units 2, and faces (is opposite to) the plurality of nozzles 10 of the four head units 2 in the vertical direction (a "second direction" of the present disclosure). The platen 3 extends in the paper width direction over the entire length of the recording paper sheet P, extends in the conveying direction over the four head units 2, and supports the recording paper sheet P from therebelow.

The conveying roller pair 4 is arranged on the upstream side in the conveying direction of the four head units 2. The conveying roller pair 5 is arranged on the downstream side in the conveying direction of the four head units 2. Each of the conveying roller pairs 4 and 5 is constructed of two rollers which are arranged side by side in the vertical direction; the conveying roller pairs 4 and 5 rotate in a state that each of the conveying roller pairs 4 and 5 pinches the paper sheet P by the two rollers to thereby convey the paper sheet P in the conveying direction.

Further, in the printer 1, it is possible to perform printing on the paper sheet P by ejecting or discharging the ink from the plurality of nozzles 10 of the eight heads 11 constructing each of the four head units 2 while conveying the paper sheet P in the conveying direction by the conveying roller pairs 4 and 5.

<Configuration of Head 11>

Next, the configuration of each of the heads 11 will be explained. As depicted in FIGS. 2, 3A, 3B and 4, each of the heads 11 is provided with a channel substrate 21, a nozzle plate 22, two dumper plates 23 and a pressure chamber plate 24.

The channel substrate 21 is a member having a shape of a rectangular parallelepiped and formed of silicon. Further, the channel substrate 21 is arranged in such a direction so that a direction of a normal vector of a (110) plane of the channel substrate 21 is parallel to the vertical direction.

The nozzle plate 22 is formed of silicon, is arranged at a central part in the conveying direction of the lower surface of the channel substrate 21, and extends in the paper width direction substantially over the entire length of the channel substrate 21.

The two damper plates 23 are formed, for example, of a synthetic resin material, etc., are arranged, respectively, at end parts on the upstream side and the downstream side in the conveying direction of the lower surface of the channel substrate 21, and extend in the paper width direction substantially over the entire length of the channel substrate 21. The two damper plates 23 are thinner, for example, than the nozzle plate 22, etc., and are elastically deformed so as to suppress any fluctuation or variation in pressure of the ink in a first common channel 36 which will be described later on.

The pressure chamber plate 24 is formed of silicon, and is arranged on the upper surface of the channel substrate 21. With this, the pressure chamber plate 24 is arranged on an upper side ("one side in the second direction" of the present disclosure) of the nozzle plate 22, and the channel substrate 21 is arranged between the nozzle plate 22 and the pressure chamber plate 24.

A stacked body of the channel substrate 21, the nozzle plate 22, the damper plates 23 and the pressure chamber plate 24 are formed with the plurality of nozzles 10, a plurality of pressure chambers 31, a plurality of descenders 32, a plurality of first throttles 33 and a plurality of second throttles 34.

The plurality of nozzles 10 are formed in the nozzle plate 22, and form the above-described two nozzle rows 9. The plurality of pressure chambers 31 are formed in the pressure chamber plate 24. Each of the plurality of pressure chambers 31 is provided individually with respect to one of the plurality of nozzles 10, and an end part on the inner side in the conveying direction of each of the plurality of pressure chambers 31 is overlapped in the vertical direction with one of the plurality of nozzles 10 corresponding thereto. Further, each of the plurality of pressure chambers 31 has a projection shape which is formed by projecting the pressure chamber 31 in the vertical direction and which is a parallelogram with the conveying direction as the longitudinal direction thereof and having a pair of opposed sides parallel to the conveying direction. Furthermore, the plurality of pressure chambers 31 are formed in the pressure chamber plate 24 at a part or portion which is different from an upper end part of the pressure chamber plate 24; a part, of the upper end part of the pressure chamber plate 24, which extends over the plurality of pressure chambers 31 is a vibration plate 24*a* covering the plurality of pressure chambers 31.

The plurality of descenders 32 are formed in the channel substrate 21. Each of the plurality of descenders 32 is formed for every set constructed of a nozzle 10 and a pressure chamber 31 which correspond to each other. Each of the plurality of descenders 32 extends to penetrate the channel substrate 21 in the vertical direction and connects a nozzle 10 corresponding thereto and the end part on the inner side in the conveying direction of a pressure chamber 31 corresponding thereto.

Further, each of the plurality of descenders 32 has a projection shape which is formed by projecting the descender 32 in the vertical direction and which is a parallelogram; and a pair of inner wall surfaces 32*a* on the both sides in the paper width direction forming a pair of opposed sides of the parallelogram is parallel to the conveying direction. The pair of inner wall surfaces 32*a* is parallel also to the vertical direction.

Each of the plurality of first throttles 33 is provided individually with respect to one of the plurality of pressure chambers 31. Each of the plurality of first throttles 31 extends in the vertical direction at an upper part of the channel substrate 21, and is connected, at an upper end thereof, to an end part on the outer side in the conveying direction of one of the plurality of pressure chambers 31 corresponding thereto. Further, each of the plurality of first throttles 33 has a projection shape which is formed by projecting the first throttle 33 in the vertical direction and which is a parallelogram having a pair of opposed sides parallel to the conveying direction.

Figure 4:
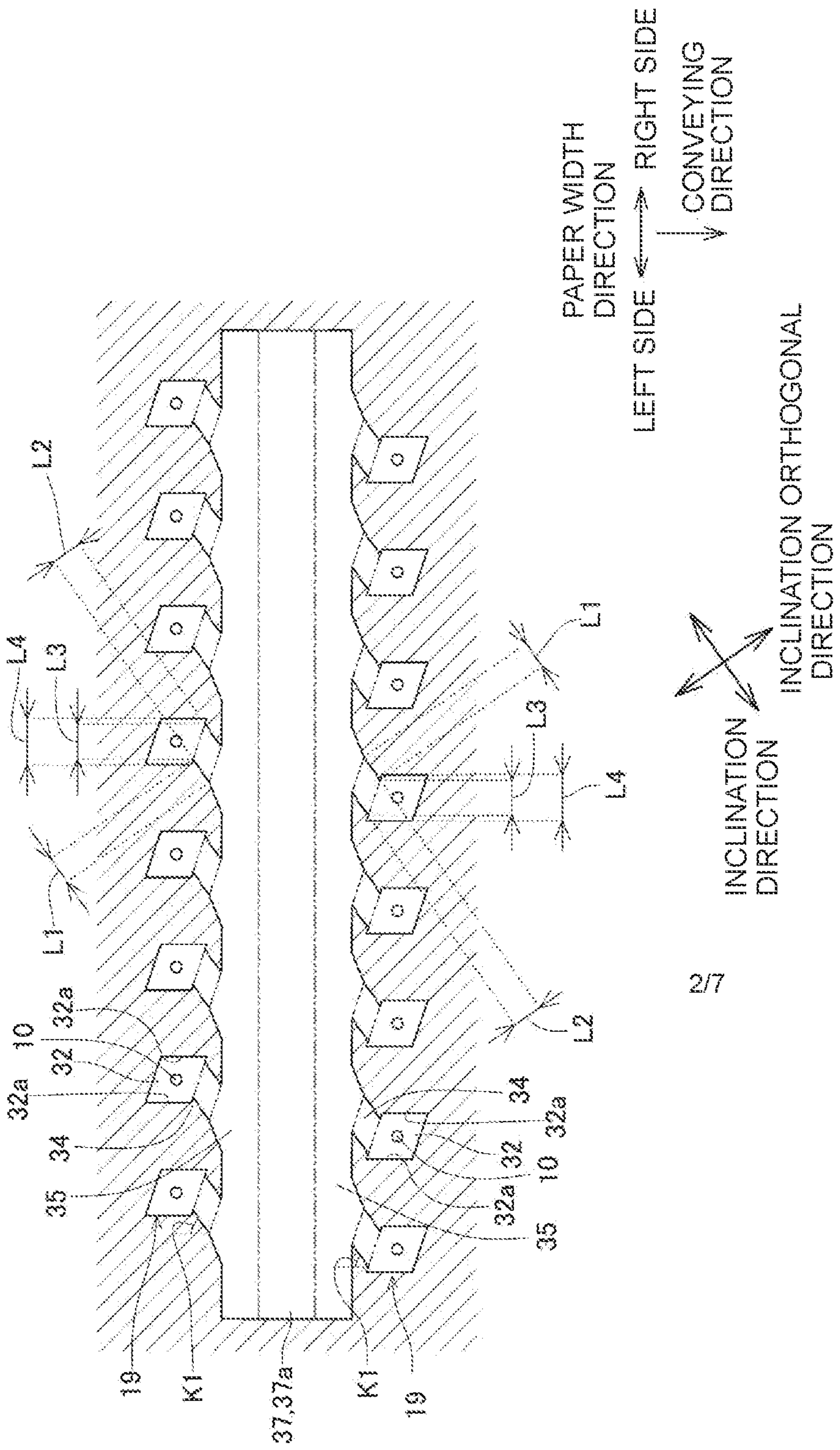
FIG. 4 is a cross-sectional view taken along a line IV-IV in FIG. 3B.

Each of the plurality of second throttles 34 is provided individually with respect to one of the plurality of descenders 32, and is formed at a lower end part of the substrate channel 21. Each of the plurality of second throttles 34 extends in an inclination direction (a "fourth direction" of the present disclosure) inclined with respect to the conveying direction by an angle K1 so that each of the plurality of second throttles 34 is inclined further toward the right side in the paper width direction as approaching closer to the upstream side in the conveying direction. The angle K1 is, for example, approximately 55 degrees. Further, each of the plurality of second throttles 34 has a length L1 in the inclination direction which is shorter than a length L2 in an inclination orthogonal direction (a "fifth direction" of the present disclosure) which is horizontal (orthogonal to the vertical direction)) and orthogonal to the inclination direction. The length L1 is preferably not more than 50 μm, and is more preferably not more than 25 μm. For example, the length L1 is approximately 15 μm. The length L2 is approximately 40 μm. Note that as depicted in FIG. 4, in the present embodiment, each of the plurality of second throttles 34 has a projection shape which is formed by projecting the second throttle 34 in the vertical direction and which is a parallelogram having a pair of opposed sides parallel to the inclination direction.

An end on the outer side in the inclination direction of each of the plurality of second throttles 34 is connected to a lower end part on the inner side in the conveying direction of one of the plurality of descenders 32 corresponding thereto. Further, a length L3 in the paper width direction at each of respective parts in the inclination direction of each of the plurality of second throttles 34 is shorter than a length L4 in the paper width direction of one of the plurality of descenders 32 corresponding thereto. Namely, in a case that second throttle 34 and descender 32 are projected in the vertical direction, a distance in the paper width direction (the length L3) between the pair of opposed sides parallel to the inclination direction in the projection shape of the second throttle 34 is shorter than the length L4 in the paper width direction of the projection shape of the descender 32.

Figure 5:
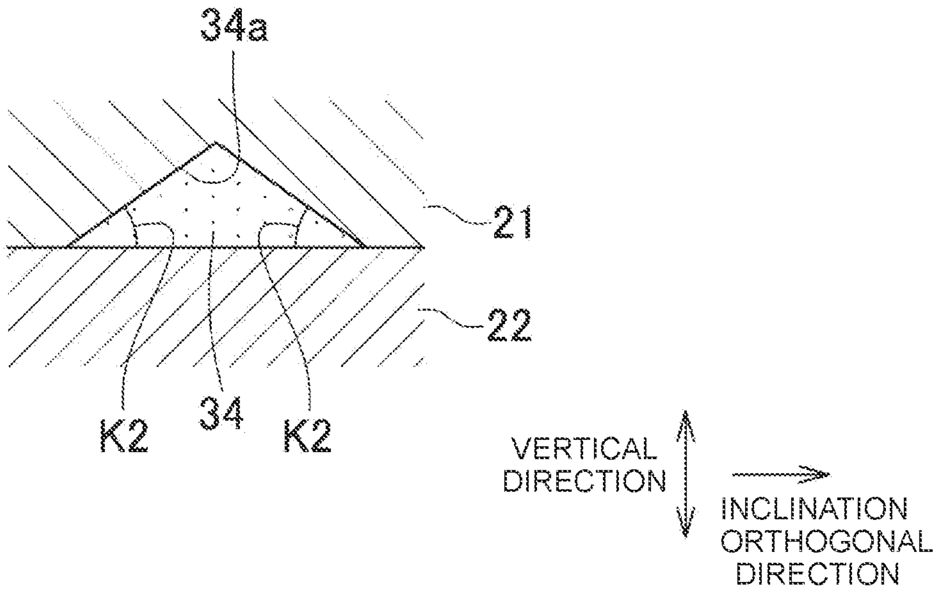
FIG. 5 is a cross-sectional view taken along a line V-V in FIG. 3B.

Furthermore, as depicted in FIG. 5, a ceiling surface 34*a*, which is an upper surface of each of the plurality of second throttles 34 is formed by the channel substrate 21. The ceiling surface 34*a* is inclined with respect to the inclination orthogonal direction by an angle K2 so that the ceiling surface 34*a* is inclined further toward the upper side (so that the ceiling surface 34*a* approaches closer toward the pressure chamber plate 24) as the ceiling surface 34*a* approaches closer to the central side (center) of the second throttle 34 in the inclination orthogonal direction. The angle K2 is, for example, approximately 35 degrees.

Here, each of the plurality of second throttles 34 having such a ceiling surface 34*a* can be formed by performed wet etching for the channel substrate 21 formed of silicon. To provide more specific explanation, in the present embodiment, the channel substrate 21 is formed of silicon, and the direction of the normal vector of the (110) plane of the channel substrate 21 is parallel to the vertical direction. Accordingly, a (111) plane in which the etching speed is slow has a certain constant inclination with respect to the surface of the substrate. Depending on the channel pattern, the (111) plane becomes to be a stopper surface, thereby forming the ceiling surface 34*a* which is inclined with respect to the inclination orthogonal direction by the angle K2 as described above.

As depicted in FIG. 5, the shape of the cross section, of the second throttle 34, which is orthogonal to the inclination direction (fourth direction) is an isosceles triangle. The equal sides of the isosceles triangle are formed by the (111) plane of the channel substrate 21 (formed of silicon). The base of the isosceles triangle is formed of the nozzle plate 22.

Further, in the present embodiment, each of the plurality of the second throttles 34 has the above-described configuration to thereby make the channel resistance in the second throttle 34 to be smaller than the channel resistance in one of the plurality of nozzles 10. For example, whereas the channel resistance in the nozzle 10 is approximately $4\times10^{13}$ $Pa\cdot s/m^3$, the channel resistance in the second throttle 34 is approximately $2\times10^{13}$ $Pa\cdot s/m^3$.

Furthermore, in the head 11, a nozzle 10, a pressure chamber 31, a descender 32, a first throttle 33 and a second throttle 34 which correspond to one another form an individual channel 20. Moreover, in the head 11, whereas the plurality of nozzles 10 form the two nozzle rows 9, a plurality of pieces of the individual channel 20 are aligned in the paper width direction to thereby form two individual channel rows 19. The two individual channel rows 19 are arranged side by side in the conveying direction.

Further, the stacked body of the channel substrate 21, the nozzle plate 22, the two damper plates 23 and the pressure chamber plate 24 are further formed with two lower side channel parts 36*a* which are lower parts of two first common channels 36, respectively, one lower side channel part 37*a* which is a lower part of one second common channel 37 and two common connecting channels 35, in addition to the plurality of individual channel 20.

The two lower side channel parts 36*a* are provided corresponding to the two individual channel rows 19, respectively. Each of the two lower side channel parts 36*a* is located on the outer side in the conveying direction of one of the two individual channel rows 19 corresponding thereto. Each of the two lower side channel parts 36*a* extends in the paper width direction over the individual channels 20 constructing one of the two individual channel rows 19 corresponding thereto. Further, a part, of each of the two lower side channel parts 36*a*, which is different from an end part on the outer side in the conveying direction is formed in the lower part of the channel substrate 21, and a lower end of the first throttle 33 of each of the individual channels 20 constructing one of the individual channel rows 19 is connected to the lower side channel part 36*a*.

Further, each of the two lower side channel parts 36*a* extends to penetrate the channel substrate 21 and the pressure chamber plate 24 in the vertical direction, at an end part in the conveying direction of each of the two lower side channel parts 36*a*. Furthermore, each of the above-described two damper plates 23 forms a wall on the lower side of one of the two lower side channel parts 36*a*; each of the above-described two damper plates 23 is elastically deformed to thereby suppress the fluctuation or variation in the pressure of the ink inside one of the two lower side channel parts 36*a*.

The lower side channel part 37*a* is arranged between the two individual channel rows 19 in the conveying direction, and extends to penetrate the channel substrate 21 and the pressure chamber plate 24 in the vertical direction. Further, the one lower side channel part 37*a* extends in the paper width direction over the plurality of individual channels 20 constructing the two individual channel rows 19.

The two common connecting channels 35 are provided individually to the two individual channel rows 19, respectively; each of the two common connecting channels 35 is arranged between the plurality of second throttles 34 corresponding thereto and the lower channel part 37*a*. Each of the two common connecting channels 35 extends in the paper width direction over the second throttles 34 corresponding thereto. Further, ends on the inner side in the conveying direction of these second throttles 34 are connected to an end on the outer side in the conveying direction of each of the two common connecting channels 35. Further, an end on the inner side in the conveying direction of each of the two common connecting channels 35 is connected to the lower channel part 37*a*. Furthermore, each of the two common connecting channels 35 is formed in the lower part of the substrate channel 21, has a length in the vertical direction which is longer than those of the second throttles 34 and which is shorter than that of the second common channel 37.

Moreover, each of the eight heads 11 is provided further with two piezoelectric actuators 25, a protective substrate 26 and a cover member 27, in addition to the channel substrate 21, the nozzle plate 22, the two damper plates 23 and the pressure chamber plate 24.

The two piezoelectric actuators 25 correspond to the two individual channel rows 19, respectively. Each of the two piezoelectric actuators 25 is provided with a piezoelectric layer 41, a common electrode 42 and a plurality of individual electrodes 43.

The piezoelectric layer 41 is formed of a piezoelectric material composed primarily of lead zirconate titanate (PZT), which is a mixed crystal of lead titanate and lead zirconate, is arranged on the upper surface of the pressure chamber plate 24 (vibration plate 24*a*), and extends in the paper width direction over the pressure chambers 31 constructing the individual channel row 19 corresponding to the piezoelectric layer 41.

The common electrode 42 extends between the pressure chamber plate 24 (vibration plate 24*a*) and the piezoelectric layer 41 over the entire areas thereof. The common electrode 42 is connected to a non-illustrated power source via a non-illustrate wiring member, etc., and is maintained at the ground potential. The plurality of individual electrodes 43 are arranged on the upper surface of the common electrode 41. Each of the plurality of individual electrodes 43 corresponds to one of the pressure chambers 31, and overlaps, in the vertical direction, with a central part of one of the pressure chambers 31 corresponding thereto. The plurality of individual electrodes 43 is connected to a non-illustrated driver IC via a non-illustrated wiring member, etc. Either one of the ground potential and a predetermined driving potential (for example, a potential in a range of approximately 20V to approximately 30V) is selectively applied to each of the plurality of individual electrodes 43 by the driver IC.

Further, corresponding to such an arrangement of the common electrode 42 and the plurality of individual electrodes 43, parts, of the piezoelectric layer 41, each of which is sandwiched between one of the plurality of individual electrodes 43 and the common electrode 42 are polarized in the vertical direction.

Here, an explanation will be given about a method of causing the piezoelectric actuator 25 to eject or discharge an ink from each of the plurality of nozzles 10. In the piezoelectric actuator 25, in a case that the ink is not discharged from the plurality of nozzles 10, the ground potential is applied to all the individual electrodes 43. In a case of causing the ink to be discharged from a certain nozzle 10, among the plurality of nozzles 10, the potential of a certain individual electrode 43, included in the plurality of individual electrodes 43 and corresponding to the certain nozzle 10, is switched from the ground potential to the driving potential. Then, an electric field in the vertical direction which is parallel to the polarization direction is generated in a part, of the piezoelectric layer 41, which is sandwiched by the individual electrode 43 and the common electrode 42. Due to this electric field, the above-described part of the piezoelectric layer 41 contracts in a horizontal direction (the paper width direction and the conveying direction) which is orthogonal to the polarization direction, thereby deforming parts, of the vibration plate 24*a* and the piezoelectric layer 41, respectively, which overlap with a certain pressure chamber 31, to project toward the side of the certain pressure chamber 31. As a result, the deformation decreases the volume of the certain pressure chamber 31, which in turn increase the pressure of the ink inside the certain pressure chamber 31, thereby discharging the ink from the certain nozzle 10 communicating with the certain pressure chamber 31. Further, after the discharge or ejection of the ink from the certain nozzle 10, the potential of the certain individual electrode 43 is returned from the driving potential to the ground potential. With this, the vibration plate 24*a* and the piezoelectric layer 41 are returned to the states thereof before the deformation.

The protective substrate 26 is formed of silicon, is arranged on the upper surface of the pressure chamber plate 24 on which the two piezoelectric actuators 25 are arranged, and covers the two piezoelectric actuators 25. More specifically, recessed parts 26*a* are formed, in the lower surface of the protective substrate 26, respectively at portions overlapping in the vertical direction with the two piezoelectric actuators 25. Further, the piezoelectric actuators 25 are accommodated in the recessed parts 26*a*, respectively.

The cover member 27 is arranged on the upper surface of the pressure chamber plate 24 on which the two piezoelectric actuators 25 and the protective substrate 26 are arranged, and covers the two piezoelectric actuators 25 and the protective substrate 26.

Further, two upper side channel parts 36*b* constructing upper parts of the two first common channels 36, respectively, are formed in the cover member 27. Each of the two upper side channel parts 36*b* overlaps in the vertical direction with one of the two lower side channel parts 36*a*, and extends in the paper width direction over the entire length of one of the two lower side channel parts 36*a*. Further, each of the two upper side channel parts 36*b* extends in the vertical direction over a part, of the cover member 27, which is different from an upper end part of the cover member 27. Furthermore, two connection ports 36*c* which extend up to an upper end of the cover member 27 are each formed in a central part in the paper width direction of one of the two upper side channel parts 36*b* corresponding thereto.

Further, the two connection ports 36*c* provided on the two first common channels 36, respectively, are connected to a pump 51*a* via a non-illustrated tube, etc. Furthermore, the pump 51*a* is connected to an ink tank 52. The pump 51*a* feeds the ink toward the connection ports 36*c* from the ink tank 52.

Moreover, an upper side channel part 37*b*, which is an upper part of the second common channel 37, is formed in the protective substrate 26 and the cover member 27. The upper side channel part 37*b* overlaps with the lower side channel part 37*a* in the vertical direction, and extends in the paper width direction over the entire length of the lower side channel part 37*a*. Further, the upper side channel part 37*b* extends in the vertical direction over a part, of the cover member 27, which is different from the upper end part thereof, and over the protective substrate 26. Furthermore, a connection port 37*c*, which extends up to the upper end of the cover member 27, is formed in a central part in the paper width direction of the upper side channel part 37*b*.

The connection port 37*c* is connected to a pump 51*b* via a non-illustrated tube, etc. Furthermore, the pump 51*b* is connected to the ink tank 52. The pump 51*b* feeds the ink toward the ink tank 52 from the connection port 37*c*.

Moreover, in the present embodiment, in a case that the pumps 51*a* and 51*b* are driven, the ink inside the ink tank 52 flows, via the non-illustrated tube, etc., into the two first common channels 36 from the two connection ports 36*c*. Further, the ink inflowed into each of the two first common channels 36 flows into the plurality of individual channels 20 from the first throttles 33. The ink flowed into each of the individual channels 20 flows out to the second common channel 37 from the second throttles 34, via the common connecting channel 35. The ink flowed into the second common channel 37 flows out from the connection port 37*c*, and returns to the ink tank 52 via the non-illustrated tube. In such a manner, in the present embodiment, it is possible to circulate the ink between each of the heads 11 and the ink tank 52.

Note that one pump among the pumps 51*a* and 51*b* may be omitted. Even in such a case, the other of the pumps 51*a* and 51*b* is driven to thereby make it possible to circulate the ink between each of the heads 11 and the ink tank 52, in a similar manner to that described above.

<Effects>

In the present embodiment, the channel substrate 21 is formed of silicon, and the direction of the normal vector of the (110) plane of the channel substrate 21 is parallel to the vertical direction. On the other hand, each of the plurality of descenders 32 which penetrates the channel substrate 21 in the vertical direction has the inner wall surfaces 32*a* which are parallel to the conveying direction and the vertical direction. With respect to this, each of the plurality of second throttles 34 formed in the channel substrate 21 extends in the inclination direction which is inclined with respect to the conveying direction by 55 degrees (K1 is in a range of 50 degrees to 60 degrees). With this, in a case of forming the plurality of descenders 32 and the plurality of second throttles 34 in the channel substrate 21 by the wet etching, the (111) plane of the channel substrate 21 becomes to be the stopper surface, thereby making it possible to form, with high precision, each of the plurality of second throttles 34 wherein this surface becomes to be the ceiling surface 34*a*.

Further, the ceiling surface 34*a* of the second throttle 34 is formed by the (111) plane of the channel substrate 21 serving as the stopper surface. With this, it is possible to form, with a high precision, the ceiling surface 34*a* of the second throttle 34 as a tapered surface oriented further toward the upper side as approaching closer to the central side of the connecting channel in the inclination orthogonal direction. Note that the ceiling surfaces (tapered surfaces) 34*a* may be parallel to the inclination direction.

Furthermore, in the present embodiment, the channel resistance in the second throttle 34 is smaller than the channel resistance in the nozzle 10. With this, it is possible to allow the ink to flow easily from the descender 32 into the second throttle 34 and to make the ink to less likely to leak from the nozzle 10 in a case that the ink is circulated between the head 11 and the ink tank 52.

Moreover, in the present embodiment, the length L3 in the paper width direction at each of respective parts in the inclination direction of each of the plurality of second throttles 34 is shorter than the length L4 in the paper width direction of one of the plurality of descenders 32 corresponding thereto. With this, in the paper width direction, the spacing distance between the second throttles 34 becomes to be greater than the spacing distance between the descenders 32. Accordingly, under a condition that the spacing distance between the descenders 32 is secured to such an extent that the ink inside a certain descender 32 is not leaked into another descender 32 adjacent to the certain descender 32, it is possible to prevent such a situation that the ink in a certain second throttle 34 is leaked to another second throttle 34 adjacent to the certain second throttle 34, in a more ensured manner.

Further, in the present embodiment, the length L1 in the inclination direction of the second throttle 34 is made to be not more than 50 μm which is short. With this, the channel resistance in the second throttle is not excessively made to be great, and it is possible to allow the ink to flow smoothly from the descender 32 to the lower side channel part 37*a* of the second common channel 37, via the second throttle 34 and the common connecting channel 35. Furthermore, in the present embodiment, the two nozzle rows 9 are arranged with the spacing distance therebetween in the conveying direction. The respective second throttles 34 are arranged between these two nozzle rows 9 in the conveying direction. Accordingly, by making the length in the inclination direction of the second throttle 34 is made to be not more than 50 μm which is short, it is possible to make the spacing distance in the conveying direction between the two nozzle rows 9 to be small. With this, the size in the conveying direction of the head 11 can be made small.

Moreover, in the present embodiment, the length L2 in the inclination orthogonal direction of the second throttle 34 which extends in the inclination direction is longer than the length L1 in the inclination direction of the second throttle 34. With this, it is possible to make the channel resistance in the second throttle 34 to be small, thereby allowing the ink to flow smoothly from the descender 32 to the second common channel 37, via the second throttle 34.

Further, in the present embodiment, each of the two common connecting channels 35 common to the plurality of second throttles 34 of the plurality of individual channels 20 constructing one of the two individual channel rows 19 is arranged between the second common channel 37 (lower channel part 37*a*) and the plurality of second throttles 34. Namely, the plurality of descenders 32 and the second common channel 37 are connected by the plurality of second throttles 34 and the common connecting channel 35. With this, it is possible to make the channel resistance in the channel connecting the plurality of descenders 32 and the second common channel 35 to be small, thereby making it possible to allow the ink to flow smoothly from the plurality of descenders 32 to the second common channel, via this channel <Modifications>

In the foregoing, the embodiment of the present disclosure has been explained. The present disclosure, however, is not limited to or restricted by the above-described embodiment; it is allowable to make a various kind of changes to the present disclosure, within the scope described in the claims.

In the above-described embodiment, each of the two common connecting channels 35 is arranged between the plurality of second throttles 34 and the lower channel part 37*a* of the second common channel 37, and the plurality of second throttles 34 and the lower channel part 37*a* of the second common channel 37 are connected via each of the two common connecting channels 35. The present disclosure, however, is not limited to or restricted by this.

Figure 6:
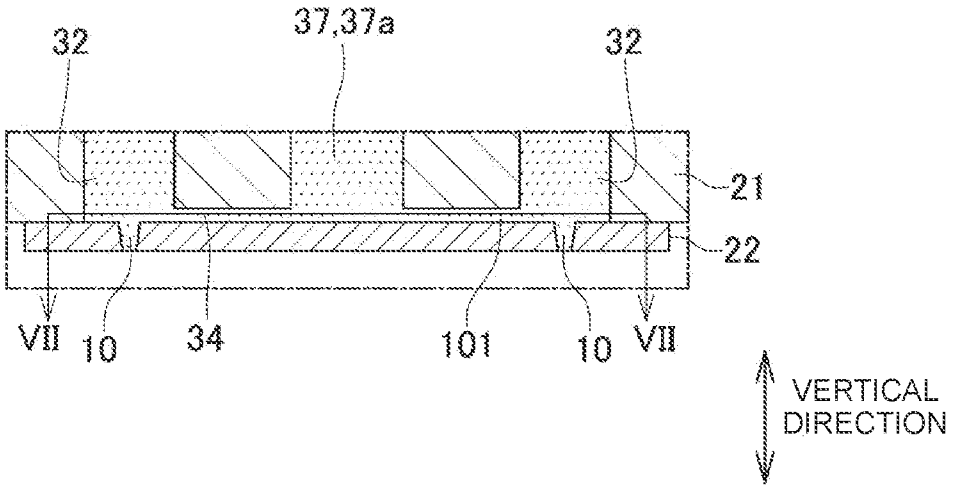
FIG. 6 is a cross-sectional view of a part of the head provided on the printer, and corresponding to FIG. 3B.
Figure 7:
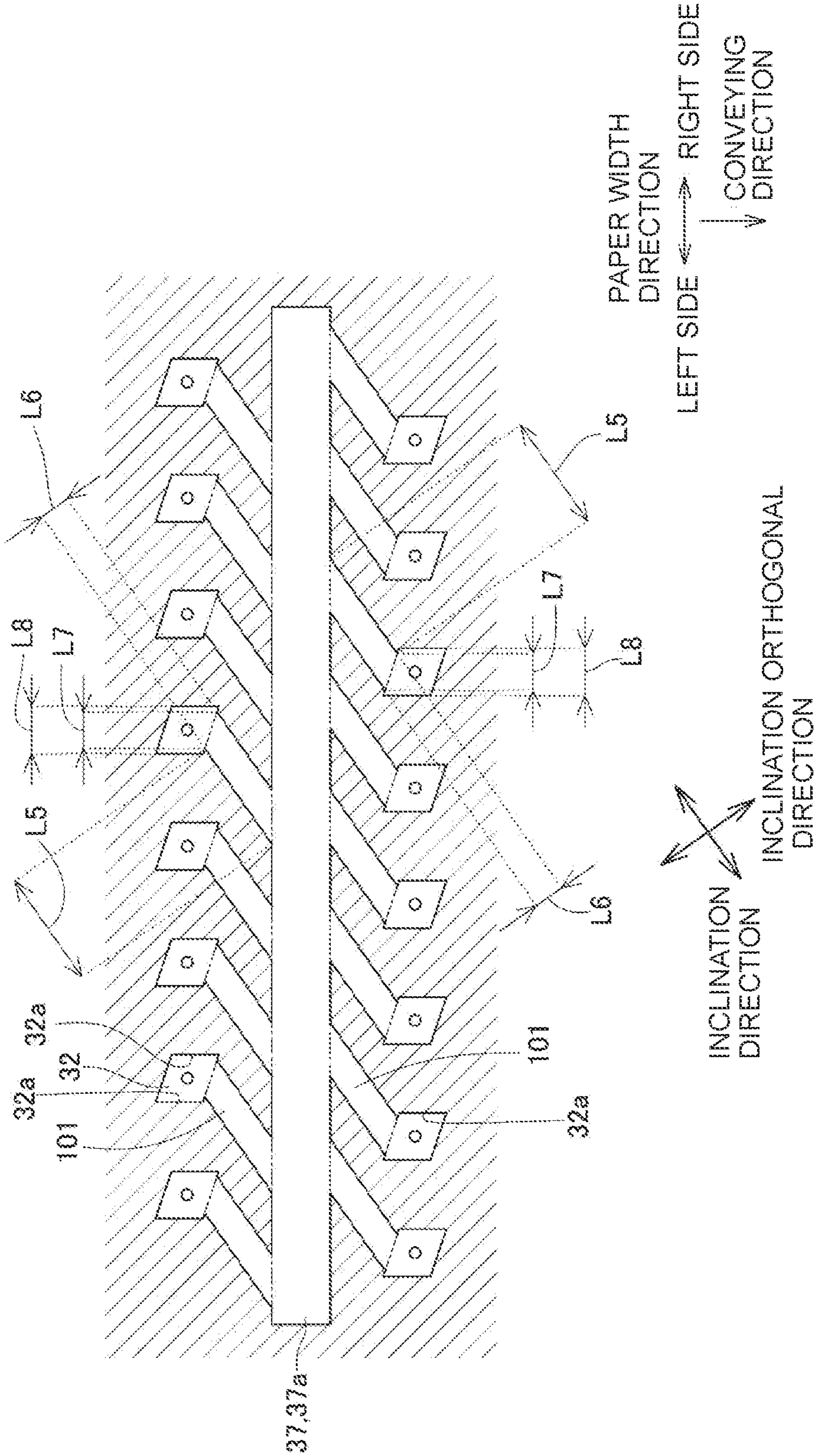
FIG. 7 is a cross-sectional view taken along a line VII-VII in FIG. 6.

In a first modification, as depicted in FIGS. 6 and 7, each of second throttles 101 is connected directly to the lower channel part 37*a* of the second common channel 37. Namely, in the first modification, the common connecting channel 35 of the above-described embodiment is not present. Further, also in the first modification, although the length L5 in the inclination direction of each of the second throttles 101 is not more than 50 μm, a length L5 in the inclination direction of each of the second throttles 101 is longer than a length L6 in the inclination orthogonal direction of each of the second throttles 101, unlike in the above-described embodiment. Further, also in the first modification, a length L7 in the paper width direction at each of respective parts in the inclination direction of each of the second throttles 101 is shorter than a length L8 in the paper width direction of one of the plurality of descenders 32 corresponding thereto.

Note that in the above-described embodiment, although the second throttle 34 has the projection shape which is formed by projecting the second throttle 34 in the vertical direction and which is the parallelogram having the pair of opposed sides parallel to the inclination direction (see FIG. 4), the present disclosure is not limited to this. As in the first modification depicted in FIG. 7, the second throttle 101 has a projection shape which is formed by projecting the second throttle 101 in the vertical direction and which has a pair of opposed sides parallel to the inclination direction. As depicted in FIG. 7, however, it is allowable that the projection shape of the second throttle 101 is not the parallelogram.

Further, in the first modification, although the length L5 in the inclination direction of the second throttle 101 is made to be longer than the length L6 in the inclination orthogonal direction of the second throttle 101, it is allowable, for example, that the length in the conveying direction of the lower channel part 37*a* is made to be longer than that in the first modification, and that the length L5 in the inclination direction of the second throttle 101 is made to be shorter than that in the first modification, thereby making it possible to make the length L5 in the inclination direction of the second throttle 101 to be not more than the length L6 in the inclination orthogonal direction of the second throttle 101.

Further, in a configuration wherein, as in the above-described embodiment, that the second throttle 34 is connected to the lower channel part 37*a* via the common connecting channel 35, it is allowable to make the length L1 in the inclination direction of the second throttle 34 to be not less than the length L2 in the inclination orthogonal direction of the second throttle 34.

Furthermore, in the above-described embodiment and first modification, although the length in the inclination direction of the second throttle 34, 101 is not more than 50 μm, the present disclosure is not limited to this. The length in the inclination direction of the second throttle 34, 101 may be longer than 50 μm.

Moreover, in the above-described embodiment, although the length L3 in the paper width direction at each of respective parts in the inclination direction of each of the plurality of second throttles 34 is shorter than the length L4 in the paper width direction of one of the plurality of descenders 32 corresponding thereto, the present disclosure is not limited to this. It is allowable that the length L3 in the paper width direction at each of respective parts in the inclination direction of each of the plurality of second throttles 34 is not less than the length L4 in the paper width direction of one of the plurality of descenders 32 corresponding thereto.

Further, in the above-described embodiment, although the channel resistance in the second throttle 34 is made to be smaller than the channel resistance in the nozzle 10, the present disclosure is not limited to this. For example, the channel resistance in the second throttle 34 may be not less than the channel resistance in the nozzle 10 to such an extent by which the ink is not leaked from the nozzle 10 in a case that the ink is circulated between the head 11 and the ink tank 52 as described above.

Furthermore, in the above-described embodiment, the direction of the normal vector of the (110) plane of the channel substrate 21 formed of silicon is parallel to the vertical direction and the second throttle 34 extends while being inclined with respect to the conveying direction by 55 degrees. The present disclosure, however, is not limited to this.

For example, the second throttle 34 may extend while being inclined with respect to the conveying direction by another angle which is different from 55 degrees and is in a range of 50 degrees to 60 degrees.

Alternatively, it is allowable that the channel substrate 21 is arranged in an orientation which is different from the orientation in which the direction of the normal vector of the (110) plane of the channel substrate 21 is parallel to the vertical direction. In this case also, by making the descender 32 penetrating the channel substrate 21 in the vertical direction to have an inner wall surface(s) parallel to the conveying direction, and by appropriately setting the orientations (directions) of the respective crystal faces (crystal planes) of the channel substrate 21 and the inclination angle of the second throttle 34 with respect to the conveying direction, it is possible to form the second throttle 34, with a high precision, depending on the crystal orientation of the channel substrate 21.

Further, in the above-described examples, the second throttle is formed only in the channel substrate 21. The present disclosure, however, is not limited to this.

Figure 8A:
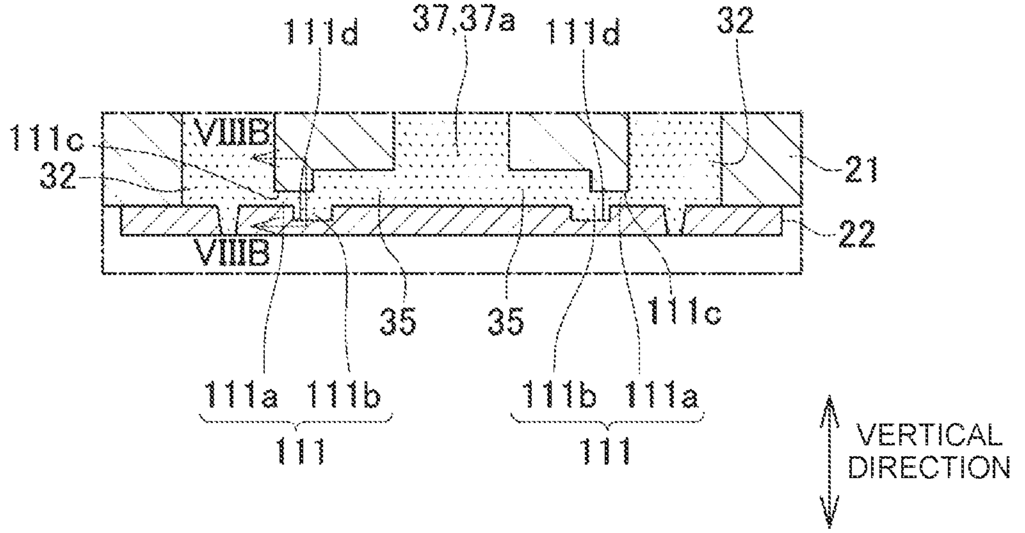
FIG. 8A is a cross-sectional view of a part of the head provided on the printer, and corresponding to FIG. 3B.
Figure 8B:
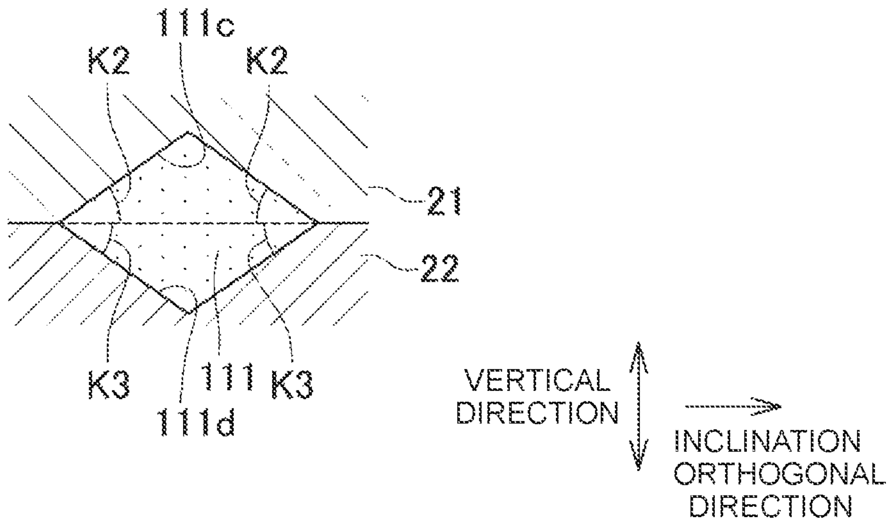
FIG. 8B is a cross-sectional view taken along a line VIIIB-VIIIB in FIG. 8A.

In a second modification, as depicted in FIGS. 8A and 8B, a second throttle 111 has a first channel part 111*a* and a second channel part 111*b*. Further, in the second modification, the nozzle plate 22 is formed of silicon, and the direction of the normal vector of a (110) plane of the nozzle plate 22 is parallel to the vertical direction.

The first channel part 111*a* is a part, of the second throttle 111, on a side of the descender 32, and is connected to the descender 32. The first channel part 111*a* is formed only in the channel substrate 21, and has a similar shape as that of a part, of the second throttle 34 of the above-described embodiment, on a side of the descender 32.

The second channel part 111*b* is a part, of the second throttle 111, on a side of the common connecting channel 35, and connects the first channel part 111*a* and the common connecting channel 35. The second channel part 111*b* extends over a lower part of the substrate channel 21 and an upper part of the nozzle plate 22.

Further, a ceiling surface 111*c*, of the second throttle 111, which extends over the first channel part 111*a* and the second channel part 111*b*, is inclined with respect to the inclination orthogonal direction by an angle K2 so that the ceiling surface 111*c* is inclined further toward the upper side as the ceiling surface 111*c* approaches closer to the central side of the second throttle 111 in the inclination orthogonal direction, in a similar manner as the ceiling surface 34*a* of the second throttle 34 of the above-described embodiment.

Further, a bottom surface 111*d*, which is a lower surface of the second channel part 111*b*, is formed by the nozzle plate 22. The bottom surface 111*d* is inclined with respect to the inclination orthogonal direction by an angle K3 so that the bottom surface 111*d* is inclined further toward the lower side ("the other side in the second direction" of the present disclosure) (so that the bottom surface 111*d* moves farther away from the pressure chamber plate 24) as the bottom surface 111*d* approaches closer to the central side (center) of the second throttle 111 (second channel part 111*b*) in the inclination orthogonal direction. The angle K3 is an angle similar to the angle K2, and is, for example, approximately 35 degrees. Note that the bottom surface of the first channel part 111*a* is a horizontal surface. Further, the ceiling surfaces (tapered surfaces) 111*c* and bottom surfaces (tapered surfaces) 111*d* may be parallel to the inclination direction.

Here, in the second throttle 111, the first channel part 111*a* and an upper part, of the second throttle 111, which are formed in the channel substrate 21 can be formed by performing the wet etching for the channel substrate 21, in a similar manner with respect to the second throttle 34 in the above-described embodiment.

Further, a lower part, of the second channel part 111*b*, which is formed in the nozzle plate 22 can be formed by performing the wet etching for the nozzle plate 22 formed of silicon. To provide more specific explanation, in the second modification, the nozzle plate 22 is formed of silicon, and the direction of the normal vector of the (110) plane of the nozzle plate 22 is parallel to the vertical direction. Accordingly, a (111) plane in which the etching speed is slow has a certain constant inclination with respect to the surface of the substrate. Depending on the channel pattern, the (111) plane becomes to be a stopper surface, thereby forming the bottom surface 111*d* which is inclined with respect to the inclination orthogonal direction by the angle K3 as described above.

As depicted in FIG. 8B, the shape of a cross section, of the second channel part 111*b* of the second throttle 111, which is orthogonal to the inclination direction (fourth direction) of the second channel part 111*b* is a rhombus. The four sides of the rhombus are formed by the (111) plane of the substrate plate 21 (made of silicon) and the (111) plane of the nozzle plate 22 (made of silicon).

In the second modification, by forming a part of the second throttle 111 across (in) the channel substrate 21 and the nozzle plate 22, it is possible to make the channel resistance in the second throttle 111 to be small. With this, the ink is allowed to flow smoothly from the descender 32 into the second common channel 37 via the second throttle 111, etc.

Further, in the second modification, parts of the second throttle 111, respectively in the channel substrate 21 and the nozzle plate 22 are formed by the wet etching. With this, it is possible to form the ceiling surface 111*c* of the second throttle 111, with a high precision, as a tapered surface oriented further toward the upper side as approaching closer to the central side of the connecting channel in the inclination orthogonal direction. Similarly, by the (111) plane of the nozzle plate 22, it is possible to form the bottom surface 111*d* of the second throttle 111, with a high precision, as a tapered surface oriented further toward the lower side as approaching closer to the central side of the second throttle 111 (second channel part 111*b*) in the inclination orthogonal direction. With these points, it is possible to form the second throttle 111 which is formed across (in) the channel substrate 21 and the nozzle plate 22, with a high precision.

Further, in the second modification, the first channel part 111*a* included in the second throttle 111 and connected to the descender 32 is formed only in the channel substrate 21. With this, it is possible to increase the precision (dimensional precision) of the first channel part 111*a*, thereby making it possible to suppress any fluctuation or variation in the discharging property of the ink among the plurality of nozzles 10.

Here, in the second modification, as described above, it is possible to form the parts of the second throttle 111, respectively in the channel substrate 21 and the nozzle plate 22 which are formed of silicon, by the wet etching. However, in the second modification, when the channel substrate 21 and the nozzle plate 22 are joined to each other, the part formed in the channel substrate 21 and the part formed in the nozzle plate 22 are joined to or combined with each other to thereby form the second throttle 111. Accordingly, in a case of considering any positional deviation during the joining of the channel substrate 21 and the nozzle plate 22, a case of forming the first channel part 111*a*, which is included in the second throttle 111 and which is to be connected to the descender 32, only in the channel substrate 21 is capable of realizing a high precision of the part, of the second throttle 111, which is to be connected to the descender 32, than in another case of forming the entirety of the second throttle across (in) the channel substrate 21 and the nozzle plate 22.

Furthermore, in the second modification, the first channel part 111*a* in the second throttle 111 is formed only in the channel substrate 21, and the second channel part 111*b* is formed across (in) the channel substrate 21 and the nozzle plate 22. The present disclosure, however, is not limited to this. It is allowable that the entirety of the second throttle 111 is formed across (in) the channel substrate 21 and the nozzle plate 22.

Moreover, in the second modification, the bottom surface 111*d* of the second channel part 111*b* is the tapered surface oriented further toward the lower side as approaching closer to the central side of the second throttle 111 (second channel part 111*b*) in the inclination orthogonal direction. The present disclosure, however, is not limited to this. The bottom surface of the second channel part 111*b* may be a horizontal surface. Further, in this case, the nozzle plate 22 may be formed of a material different from the silicon.

Further, in the above-described embodiment, the first throttle 23 is formed in the channel substrate 21, and the first common channel 36 is formed across (in) the pressure chamber plate 24 and the cover member 27. The present disclosure, however, is not limited to this. For example, it is allowable that the first throttle 33 is formed in the pressure chamber plate 24, and that the first common channel 36 is formed only across (in) the pressure chamber plate 24 and the cover member 27.

Further, although the foregoing explanation has been given about the example wherein the present disclosure is applied to the head which discharges or ejects the ink(s) from the nozzles, the present disclosure is not limited to this configuration. For example, it is also possible to apply the present disclosure to a liquid discharging head which is configured to discharge a liquid different from the ink.

Note that the above-described embodiment and respective modifications may be combined with each other as long as the embodiment and respective modifications are not mutually exclusive.

What is claimed is:

1. A liquid discharging head comprising:

a supply common channel;

a return common channel; and a plurality of individual channels which communicate with the supply common channel and the return common channel and which are aligned in a first direction, wherein each of the plurality of individual channels has:

a nozzle formed in a nozzle plate;

a pressure chamber which is formed in a pressure chamber plate and which communicates with the supply common channel, the pressure chamber plate being arranged to be apart from the nozzle plate in a second direction orthogonal to the first direction;

a descender which is formed in a channel substrate, which extends in the second direction and which connects the nozzle and the pressure chamber, the channel substrate being formed of silicon and arranged between the nozzle plate and the pressure chamber plate in the second direction, the shape of the descender is a rhombus; and a connecting channel which is formed in the channel substrate, and which connects the descender and the return common channel, wherein the return common channel is formed in the channel substrate;

the descender penetrates the channel substrate in the second direction, and has an inner wall surface parallel to the second direction and to a third direction orthogonal to both of the first direction and the second direction;

the connecting channel extends in a fourth direction which is orthogonal to the second direction and which is inclined with respect to the third direction;

the supply common channel penetrates the pressure chamber plate and the channel substrate in the second direction and extends along the channel substrate in the third direction;

wherein a direction of a normal vector of a (110) plane of the silicon forming the channel substrate is parallel to the second direction;

wherein the fourth direction is inclined with respect to the third direction by an angle in a range of 50 degrees to 60 degrees;

wherein a shape of a cross section of the connecting channel, which is orthogonal to the fourth direction, is an isosceles triangle; and wherein in the cross section of the connecting channel, equal sides of the isosceles triangle are formed by a (111) plane of the silicon forming the channel substrate.

2. The liquid discharging head according to claim 1, wherein in the cross section of the connecting channel, a base of the isosceles triangle is formed of the nozzle plate.

3. The liquid discharging head according to claim 1, wherein a channel resistance in the connecting channel is smaller than a channel resistance in the nozzle.

4. The liquid discharging head according to claim 1, further comprising a common connecting channel connecting the return common channel and the connecting channel of each of the plurality of individual channels;

the common connecting channel is formed in the channel substrate, is positioned between the plurality of individual channels and the return common channel in the third direction, and extends in the first direction across a range in which the plurality of individual channels are aligned; and a length in the second direction of the common connecting channel is shorter than a length in the second direction of the return common channel.

5. The liquid discharging head according to claim 4, wherein the length in the second direction of the common connecting channel is longer than a length in the second direction of the connecting channel.

6. The liquid discharging head according to claim 1, wherein a length in the fourth direction of the connecting channel is not more than 50 μm.

7. The liquid discharging head according to claim 1, wherein a length in the fourth direction of the connecting channel is shorter than a length in a fifth direction of the connecting channel, the fifth direction being orthogonal to both of the second direction and the fourth direction.

8. The liquid discharging head according to claim 1, wherein a length in the fourth direction of the connecting channel is longer than a length in a fifth direction of the connecting channel, the fifth direction being orthogonal to both of the second direction and the fourth direction.

9. The liquid discharging head according to claim 8, wherein the connecting channel is directly connected to the return common channel.

10. The liquid discharging head according to claim 1, wherein the connecting channel is formed across the channel substrate and the nozzle plate.

11. The liquid discharging head according to claim 10, wherein the connecting channel has:

a first channel part connected to the descender, and a second channel part communicating the first channel part and the return common channel;

the first channel part is formed only in the channel substrate; and the second channel part is formed across the channel substrate and the nozzle plate.

12. The liquid discharging head according to claim 11, wherein a direction of a normal vector of a (110) plane of the silicon forming the channel substrate is parallel to the second direction;

the nozzle plate is formed of silicon, and a direction of a normal vector of a (110) plane of the silicon forming the nozzle plate is parallel to the second direction; and a shape of a cross section, of the second channel part of the connecting channel, which is orthogonal to the fourth direction is a rhombus.

13. The liquid discharging head according to claim 12, wherein in the cross section, of the second channel part of the connecting channel, four sides of the rhombus are formed of a (111) plane of the silicon forming the channel substrate and of a (111) plane of the silicon forming the nozzle plate.

14. The liquid discharging head according to claim 1, wherein the nozzle plate is formed of silicon;

a direction of a normal vector of a (110) plane of the silicon forming the nozzle plate is parallel to the second direction;

the connecting channel is formed across the channel substrate and the nozzle plate;

the inner wall surface of the connecting channel includes a tapered surface formed by the nozzle plate, and the tapered surface formed by the nozzle plate is parallel to the fourth direction, and inclined with respect to the fifth direction so that the tapered surface of the nozzle plate moves away farther from the pressure chamber plate in the second direction as the tapered surface of the nozzle plate approaches closer to the center of the connecting channel in the fifth direction.

15. The liquid discharging head according to claim 1, wherein the descender has a rhombus shape with two inner wall surfaces parallel to the third direction when viewed in the second direction.

* * * * *